US 011618112B2

(12) United States Patent
Graham et al.

(10) Patent No.: US 11,618,112 B2
(45) Date of Patent: Apr. 4, 2023

(54) REMANUFACTURED PINION SHAFT AND METHOD OF MAKING

(71) Applicant: Caterpillar Inc., Peoria, IL (US)

(72) Inventors: Curtis John Graham, Peoria, IL (US); Christopher Anthony Kinney, Iuka, MS (US)

(73) Assignee: Caterpillar Inc., Peoria, IL (US)

( * ) Notice: Subject to any disclaimer, the term of this patent is extended or adjusted under 35 U.S.C. 154(b) by 349 days.

(21) Appl. No.: 16/856,310

(22) Filed: Apr. 23, 2020

(65) Prior Publication Data

US 2021/0332876 A1    Oct. 28, 2021

(51) Int. Cl.
*B23P 6/00* (2006.01)
*B21K 1/12* (2006.01)
*F16D 1/10* (2006.01)

(52) U.S. Cl.
CPC ............... *B23P 6/00* (2013.01); *B21K 1/12* (2013.01); *F16C 2237/00* (2013.01); *F16D 2001/103* (2013.01); *Y10T 29/4973* (2015.01)

(58) Field of Classification Search
CPC ......... B21D 53/84; B21D 53/845; B23P 6/00; B23P 6/04; B23P 2700/02; B23P 2700/07; F16C 2237/00; F16C 2226/12
See application file for complete search history.

(56) References Cited

U.S. PATENT DOCUMENTS

| 4,527,322 | A | * | 7/1985 | Jackson ................. B23D 47/12 29/402.06 |
| 5,743,670 | A | | 4/1998 | Ader |
| 2007/0099746 | A1 | | 5/2007 | Hahlbeck |
| 2018/0202534 | A1 | | 7/2018 | Chunn et al. |

FOREIGN PATENT DOCUMENTS

| CN | 203214841 | 9/2013 |
| DE | 202013103826 | 9/2013 |

* cited by examiner

*Primary Examiner* — Christopher J Besler
(74) *Attorney, Agent, or Firm* — Lee & Hayes, PLLC

(57) ABSTRACT

A remanufactured pinion shaft includes a salvage member secured to a replacement member. The salvage member may be formed from a damaged pinion shaft and includes first gear teeth proximate a first axial end and a first alignment member proximate a second axial end. The replacement member includes second gear teeth proximate a first axial end and a second alignment member proximate a second axial end. The first alignment member and the second alignment member cooperate to transmit rotational motion between the first salvage member and the replacement member and/or align the salvage member relative to the replacement member.

14 Claims, 5 Drawing Sheets

REMANUFACTURED PINION SHAFT AND METHOD OF MAKING

TECHNICAL FIELD

This disclosure relates generally to industrial machines, and, more specifically, to remanufacturing broken components, such as pinion shafts, of machines, such as a well stimulating pumps.

BACKGROUND

Some conventional machines, e.g., well stimulating pumps used in hydraulic fracking or other high-pressure applications, include a pinion shaft. In some arrangements, the pinion shaft includes gear teeth configured to mesh with one or more gears, e.g., bull gears, to transmit power to drive pistons at the well stimulating pump. A conventional pinion shaft is a unitary member having a first set of gear teeth proximate a first end for driving a first gear and a second set of gear teeth proximate a second end for driving a second gear. A common failure point of these conventional pinion shafts is at the gear teeth. For example, even slight misalignment of the sets of gear teeth can cause stresses that result in cracking and/or breaking of gear teeth. Once broken, the gear teeth fail to perform as intended, e.g., by reducing power transmitted to the pistons of the pump, causing the system to fail. Once one or more of the teeth are damaged, the conventional practice is to replace the entire pinion shaft, discarding the damaged pinion shaft. Accordingly, it may be useful to provide an improved process and system that salvages at least a portion of the damaged pinion shaft, to reduce waste. Moreover, it may be useful to provide an improved process and system to reduce costs associated with replacing the pinion shaft, e.g., by reducing costs associated with an extraneous amount of new material required, by reducing a number of fasteners and other new parts as in some conventional repairs, or the like.

U.S. Patent Application Publication No. 2018/0202534 (hereinafter referred to as the '534 reference) describes a modular pinion shaft. In particular, the '534 reference describes a modular pinion shaft including first and second pinion gear members secured to opposing ends of a tubular member. The pinion gear members are secured to the tubular member using fasteners, such as screws or bolts. Using the fasteners allows for the first and second pinion gear members to be secured to tubular members of different lengths, e.g., for adaptability to different systems. Thus, '534 reference teaches a complex arrangement intended to completely replace a conventional, e.g., unitary, pinion shaft. However, the '534 reference does not disclose details for remanufacturing a conventional pinion shaft. Moreover, the '534 reference requires additional components, e.g., a number of mechanical fasteners, and requires additional material to manufacture, because the tubular member must have an oversized diameter relative to the pinion gear members to promote attachment via the fasteners.

Example implementations of the present disclosure are directed toward overcoming the deficiencies described above.

SUMMARY

In an aspect of the present disclosure, a method of remanufacturing a pinion shaft includes providing a pinion shaft comprising a first generally cylindrical body extending axially from a first end to a damaged end. The pinion shaft further includes a plurality of first gear teeth proximate the first end. The method also includes cutting the pinion shaft at a position between the first end and the damaged end to form a salvage member comprising the first end, the plurality of first gear teeth, and a second end spaced axially from the first end. The method also includes forming, on the salvage member proximate the second end, an axial protrusion. The method also includes providing a replacement member. The replacement member includes a second generally cylindrical body extending axially from a third end to a fourth end, a second plurality of gear teeth proximate the third end, and a receptacle proximate the fourth end. The method also includes securing the salvage member to the replacement member such that the axial protrusion is received in the receptacle.

In another aspect of this disclosure, a remanufactured pinion shaft includes a salvage member formed at least in part by removing a damaged end of a damaged pinion shaft and a replacement member. The salvage member includes a first generally cylindrical body extending axially from a first end to a second end, a first plurality of gear teeth proximate the first end, and a first alignment member proximate the second end. The replacement member includes a second generally cylindrical body extending axially from a third end to a fourth end, a second plurality of gear teeth proximate the third end, and a second alignment member proximate the fourth end. The second alignment member cooperates cooperate with the first alignment member to align the first plurality of gear teeth relative to the second plurality of gear teeth.

In yet another aspect of this disclosure, a method of making a remanufactured pinion shaft includes providing a pinion shaft including a first generally cylindrical body extending axially from a first end to a damaged end. The pinion shaft includes a plurality of first gear teeth proximate the first end. The method also includes cutting the pinion shaft at a position between the first end and the damaged end to form a salvage member comprising the first end, the plurality of first gear teeth, and a second end spaced axially from the first end. The method also includes forming, on the salvage member proximate the second end, a first alignment member. The method also includes providing a replacement member comprising a second generally cylindrical body extending axially from a third end to a fourth end, a second plurality of gear teeth proximate the third end, and a second alignment member proximate the fourth end. The method also includes securing the salvage member to the replacement member such that the first alignment member cooperates with the second alignment member to align the plurality of first gear teeth relative to the plurality of second gear teeth.

DETAILED DESCRIPTION

This disclosure generally relates to remanufactured pinion shafts and methods for remanufacturing damaged pinion shafts. Pinion shafts like those described herein can be used in many industrial applications, including but not limited to in well stimulating pumps, such as those used in high pressure fracking applications. Wherever possible, the same reference numbers will be used through the drawings to refer to the same or like features.

Figure 1:
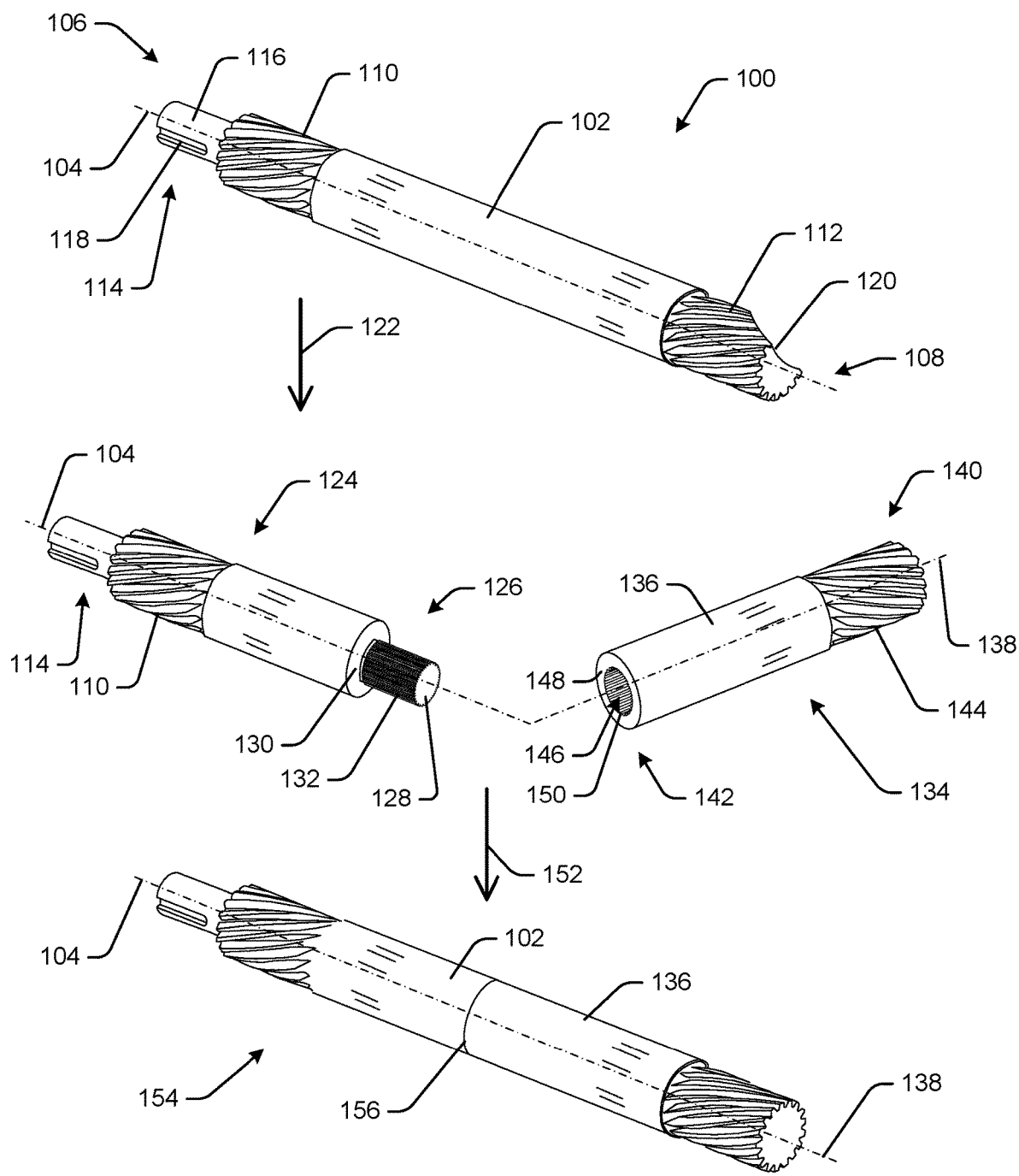
FIG. 1 is a visual flowchart illustrating a process of remanufacturing a damaged pinion shaft to form a remanufactured pinion shaft, in accordance with an example of the present disclosure.

FIG. 1 is a visual flow diagram illustrating aspects of this disclosure. In more detail, FIG. 1 illustrates a damaged pinion shaft 100 and a process for remanufacturing the damaged pinion shaft 100. As illustrated, the damaged pinion shaft 100 includes a generally elongate body 102 extending along an axis 104 between a first end 106 and a second end 108. First gear teeth 110 are formed proximate the first end 106 and second gear teeth 112 are formed proximate the second end 108. As described further herein, the first gear teeth 110 are configured to cooperate with mating gear teeth formed on a first gear, e.g., a first bull gear, and the second gear teeth 112 are configured to cooperate with mating gear teeth formed on a second gear, e.g., a second bull gear.

As also illustrated in FIG. 1, the damaged pinion shaft 100 includes a drive coupling 114 proximate the first end 106. The illustrated drive coupling 114 has a generally cylindrical outer surface 116 and extends axially beyond the first gear teeth 110 (e.g., in a direction away from the elongate body 102). The drive coupling 114 facilitates attachment of the pinion shaft 100 to a motor or other power source. As illustrated, the drive coupling 114 includes a slot 118 formed in the outer surface 116. In examples, the drive coupling 114 may be received directly in an aperture of a motor shaft (not shown) or of some other power transmission component. In examples, the aperture receiving the drive coupling 114 may include a key sized to be received in the slot 118 although in other examples the aperture receiving the drive coupling may have a slot formed to cooperate with the slot 118, which together receive a key. Example power transmission components can include, but are not limited to, a coupling, a gear, a pulley, or the like. The drive coupling 114 including the slot 118 is for example only. Depending on the system design and/or the component(s) with which the damaged pinion shaft 100 is used, the drive coupling 114 can be otherwise formed and/or include one or more additional and/or other features for coupling to a power transmission component.

FIG. 1 also illustrates that the damaged pinion shaft 100 includes a damaged portion 120. The damaged portion 120 is illustrated as a plurality of the second gear teeth 112 broken. In other examples, the damaged portion 120 may include more or fewer broken teeth. In still further examples, the damaged portion 120 may be other than broken teeth. By way of non-limiting example, the damaged portion 120 can include one or more worn teeth 112. Generally, the damaged portion 120 can be any feature or condition that causes the damaged pinion shaft 100 to underperform and/or fail to perform as intended. Moreover, although the damaged portion 120 is shown in the example of FIG. 1 in connection with the second gear teeth 112, implementations of this disclosure are equally applicable to damage occurring at the first gear teeth 110 and/or at the drive coupling 114. The techniques described herein may be used to remedy any number of types and/or locations of damage to the damaged pinion shaft 100 that cause the damaged pinion shaft 100 to perform other than as intended.

As illustrated by the arrow 122, the damaged pinion shaft 100 can be machined and/or otherwise refurbished into a salvage member 124. In this example, the first gear teeth 110 and the drive coupling 114 are still functional. Stated differently, although the damaged portion 120 makes the damaged pinion shaft 100 unusable, features proximate the first end 106 are undamaged. The techniques described herein reuse those functional portions. In examples, the damaged pinion shaft 100 is cut, machined, or otherwise separated at an axial position along the axis 104. By way of nonlimiting example, the damaged pinion shaft 100 can be cut at a position along the axis 104 so as to retain an axial portion of the elongate body 102 and the first end 106, including the first gear teeth 110 and the drive coupling 114. The remainder of the damaged pinion shaft 100, e.g., the remaining axial portion of the elongate body 102 and the second gear teeth 112, including the damaged portion 120, may be disposed of and/or otherwise used.

The cutting or other separation technique exposes a salvage member end 126 opposite the first end 106. As noted above, the salvage member 124 includes the first gear teeth 110 and the drive coupling 114 proximate the first end 106. The salvage member 124 is further machined or formed, as described herein, to provide one or more alignment features proximate the salvage member end 126. In the example of FIG. 1, the salvage member end 126 includes an axial protrusion 128 extending along the axis 104 from a salvage member face 130. A plurality of splines 132 are formed on an outer surface of the axial protrusion 128. In some implementations, the salvage member 124 can be machined with a lathe or similar tool to form the axial protrusion 128, and the splines 132 may be formed on the axial protrusion 128 using known techniques.

In examples of this disclosure, the salvage member 124 is configured to be mated to a replacement member 134. In examples, the replacement member 134 may be a separate part, e.g., an aftermarket part, including some features of an original pinion shaft. In this example, the replacement member 134 includes a generally cylindrical, elongate body 136 extending along an axis 138 from a first replacement member end 140 to a second replacement member end 142. The replacement member 134 includes a plurality of replacement gear teeth 144 proximate the first replacement member end 140. The replacement gear teeth 144 are functionally equivalent to the second gear teeth 112, prior to the second gear teeth being damaged, as discussed above. As also illustrated in FIG. 1, the replacement member 134 includes one or more alignment members to assist in connecting the replacement member 134 and the salvage member 124. More specifically, at the second replacement member end 142, the replacement member 134 includes a receptacle 146 formed as an axial bore. More specifically, the receptacle 146 is a blind hole extending from a replacement member face 148 into the elongate body 136 generally along the axis 138. The receptacle 146 defines an inner surface, and a plurality of grooves 150 are formed in the inner surface. The grooves 150 are sized and spaced to receive the splines 132 formed on the salvage member 124.

As shown by the arrow 152, the salvage member 124 and the replacement member 134 are joined to form a remanufactured pinion shaft 154. In more detail, the axial protrusion 128 may be inserted into the receptacle 146 with the splines 132 received in the grooves 150. Upon complete insertion, the salvage member face 130 abuts the replacement member face 148 at a junction 156. As illustrated, the axis 104 and the axis 138 are substantially coaxial when the salvage member 124 and the replacement member 134 are joined. Also in examples of this disclosure, the salvage member 124 may be secured to the replacement member 134 at the junction 156. By way of nonlimiting example, the salvage member 124 may be welded to the replacement member 134 at the junction 156. Other securement means or mechanisms, including mechanical securement means, may also or additionally be used to secure the salvage member 124 and the replacement member 134 at the junction 156.

As illustrated in FIG. 1, the remanufactured pinion shaft 154 is substantially identical to an original pinion shaft, e.g., the damaged pinion shaft 100 prior to being damaged and/or at manufacture. The remanufactured pinion shaft 154 may be functionally equivalent to the original pinion shaft. For instance, the elongate body 136 of the replacement member 134 may have a constant outer diameter that is nominally the same as an outer diameter of the elongate body 102. Moreover, the replacement gear teeth 144 may be the same as the second gear teeth 112, e.g., prior to being damaged. Although the remanufactured pinion shaft 154 is a functional equivalent, because of the techniques described herein, a portion of the damaged pinion shaft 100 is salvaged, thereby obviating the need for a completely new pinion shaft.

The salvage member 124 may be formed from the damaged pinion shaft 100 using conventional manufacturing methods. For example, and as detailed further herein, the salvage member may be formed by cutting the damaged portion e.g., to form a surface normal to the axis 104, turning the salvage member 124 at the salvage member end 126 to form the axial protrusion 128, and machining splines 132 on the axial protrusion 128. The replacement member 134 may be pre-formed, e.g., having a known length and/or groove pattern, with the salvage member 124 being formed to cooperate therewith. By way of nonlimiting example, the overall axial length of the salvage member 124 and/or a distance of the salvage member face 130 from the drive coupling 114 or other feature at the first end 106 may be determined based on the overall length of the replacement member 134 and/or a desired overall length of the remanufactured pinion shaft 154. Similarly, the number, size, profile, and/or other attributes of the splines 132 are formed to mate and engage with the grooves 150. Although the illustrated example includes forming the axial protrusion 128 on the salvage member 124 and the receptacle 146 in the replacement member 134, other examples may include forming a receptacle, like the receptacle 146, in the salvage member end 126 and providing an axial protrusion, like the axial protrusion 128, on the replacement member 134.

Figure 4:
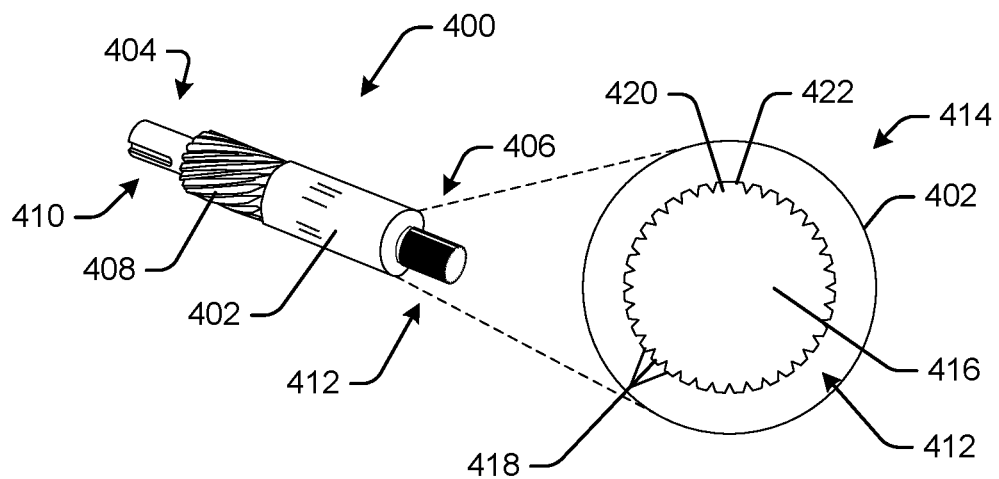
FIG. 4 illustrates an example alignment member formed on a salvage member, in accordance with an example of the present disclosure.
Figure 5:
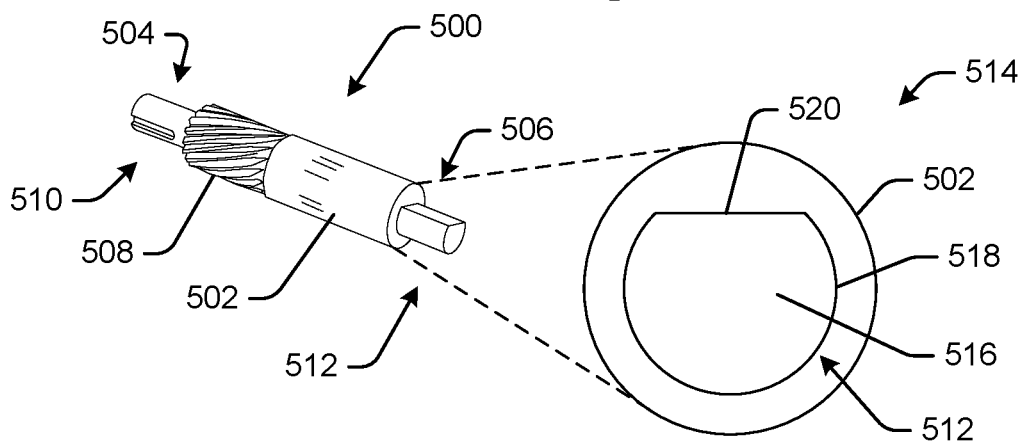
FIG. 5 illustrates another example alignment member formed on a salvage member, in accordance with an example of the present disclosure.
Figure 6:
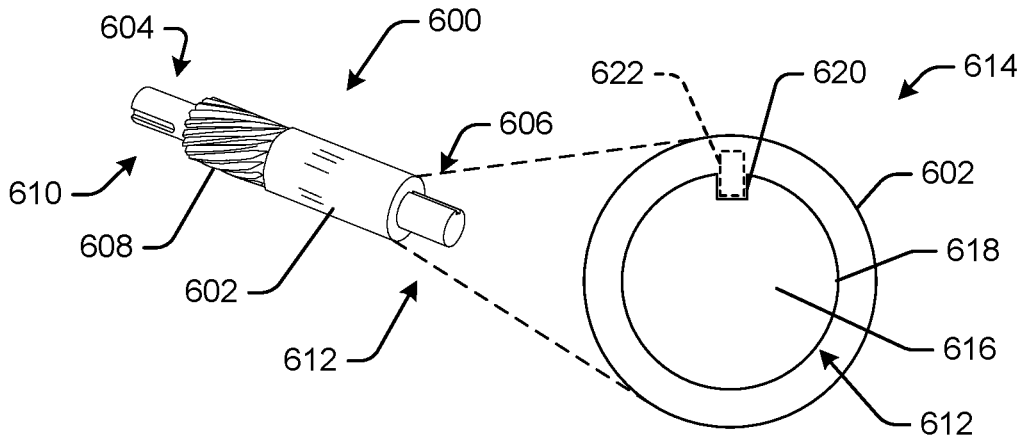
FIG. 6 illustrates yet another example alignment member formed on a salvage member, in accordance with an example of the present disclosure.

In FIG. 1, the splines 132 and the grooves 150 are example alignment features that cooperate to transmit power, e.g. from the salvage member 124 to the replacement member 134. More specifically, when the remanufactured pinion shaft 154 is installed for use, e.g., in place of the damaged pinion shaft 100, a power source (not shown) imparts a rotational motion on the salvage member 124 at the drive coupling 114. This rotational motion may then be transferred to the replacement member 134 via the cooperating splines 132 and grooves 150. Although the foregoing description refers to the splines 132 being formed on the axial protrusion 128 and the grooves 150 being formed in the receptacle 146, those having ordinary skill in the art will appreciate that the grooves 150 may be internal splines in the receptacle 146, cooperating with grooves, e.g., formed between external splines on the axial protrusion 128. Moreover, aspects of this disclosure are not limited to using a spline arrangement to transmit rotational movement from the salvage member 124 to the replacement member 134. For instance, as noted above, a weld or other securement mechanism may be formed at the junction 156 to secure the salvage member 124 to the replacement member 134. Such weld or securement mechanism can also transmit some or all power from the salvage member 124 to the replacement member 134. In still further examples, the salvage member end 126 of the salvage member 124 and the second replacement member end 142 of the replacement member 134 may include different alignment members that effectuate power transmission. For instance, the axial protrusion 128 and the receptacle 146 may be configured to cooperate via an interference fit, a non-circular cross-section, a threaded connection, a keyed interface, or the like. FIGS. 4, 5, and 6, detailed below, illustrate some additional example alignment member configurations that may be used to transmit power between the salvage member 124 and the replacement member 134.

In addition to providing power transmission between the salvage member 124 and the replacement member 134, alignment members such as the splines 132 and the grooves 150 may also be useful to align the replacement gear teeth 144, e.g., relative to the first gear teeth 110. As will be appreciated, new splines are manufactured to tolerances, including tolerances associated with alignment of the first gear teeth 110 to the second gear teeth 112. Accordingly, a first gear driven by the first gear teeth 110 and a second gear driven by the second gear teeth 112 rotate in a planned, desired manner. In examples, the replacement member may be similarly manufactured to tolerances associated with an alignment of the replacement gear teeth 144. In the example of FIG. 1, the replacement gear teeth 144 may be disposed relative to the grooves 150 within some tolerance. Similarly, the splines 132 may be formed at positions relative to the first gear teeth 110 (or relative to some other feature disposed relative to the first gear teeth 110). When coupled to form the remanufactured pinion shaft 154, the splines 132 and the grooves 150 properly position the replacement gear teeth 144 relative to the first gear teeth 110.

In implementations, features other than, or in addition to, the splines 132 and the grooves 150 may be used as alignment members to properly align the salvage member 124 and the replacement member 134. For example, at least one of the salvage member 124 or the replacement member 134 may include an additional or alternate alignment member. An alignment member, or alignment members, can be any feature, or combination of features, that cause the salvage member 124 to be oriented relative to the replacement member 134, e.g., rotationally about the axes 104, 138 and/or that promote transmission of rotational motion between the salvage member 124 and the replacement member 134. In examples discussed below in connection with FIGS. 4, 5, and 6, some example alignment members can include differently sized or shaped splines, keyed arrangements, non-circular shaft profiles, or combinations thereof.

Although FIG. 1 illustrates an example in which the second gear teeth 112 are damaged, the techniques described herein are not limited to this example. In one alternate example, the first gear teeth 110 may be broken, worn, or otherwise unsuitable for continued use. Continuing this example, a salvage member may be formed from the second end 108 of the damaged pinion shaft 100, e.g., by removing a portion of the damaged pinion shaft including the first end 106. Then, features like the axial protrusion 128 may be formed on this alternate salvage member. Also in this example, the replacement member may include replacement gear teeth that are functionally equivalent to the first gear teeth 110, e.g., the damaged gear teeth in this example, a coupling, like the drive coupling 114, as well as any other features associated with the removed first end 106. This alternate replacement member may also include a receptacle like the receptacle 146 and its associated components. As with the illustrated implementation, this alternate salvage member and the replacement member may be joined to form the remanufactured pinion shaft 154. Accordingly, the techniques described herein may be useful to remanufacture pinion shafts having damage and/or one or more defects proximate either end, e.g., without the need for a complete replacement pinion shaft.

Figure 2:
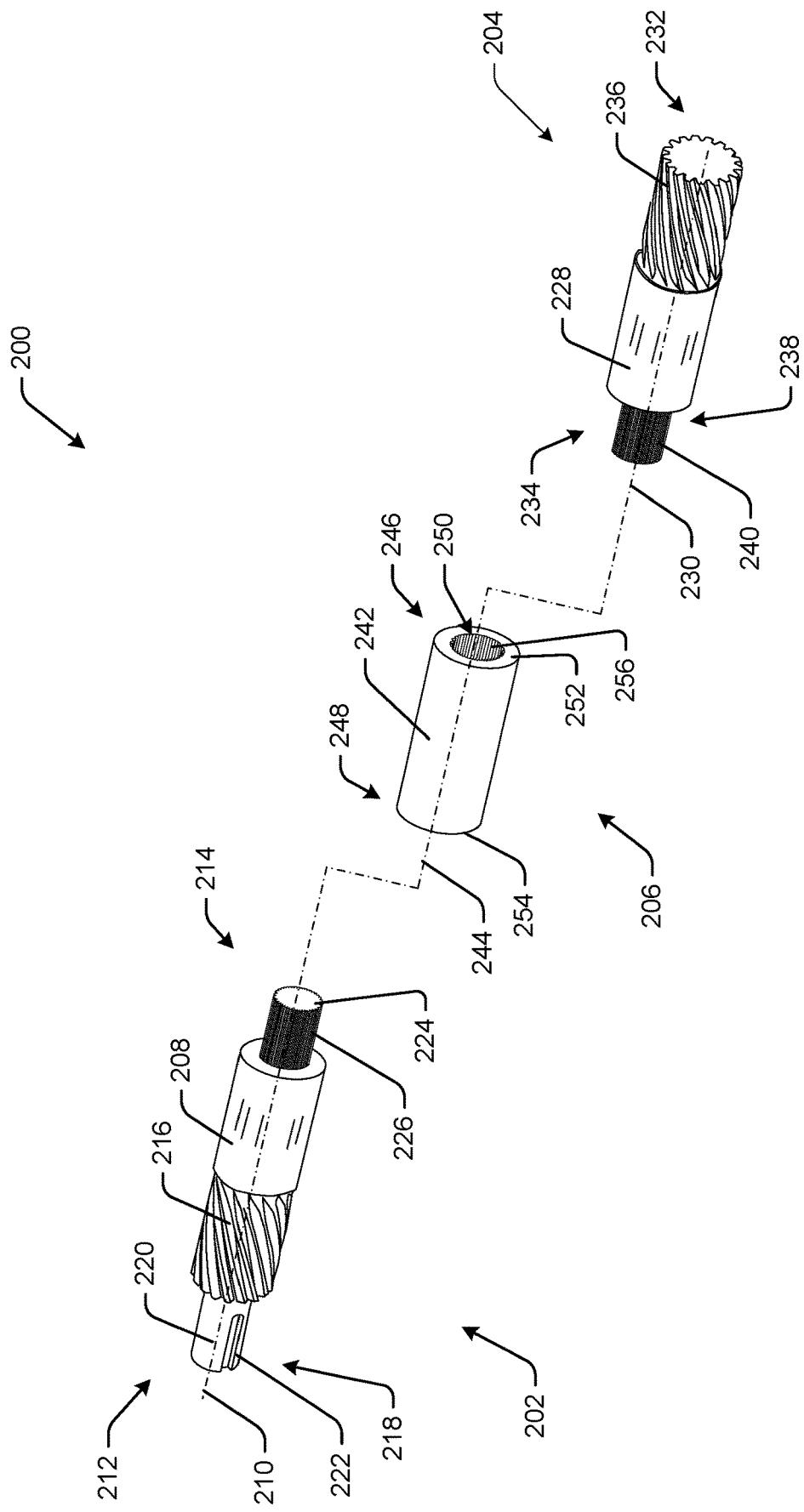
FIG. 2 is an exploded perspective view of an example of a remanufactured pinion shaft, in accordance with another example of the present disclosure.

FIG. 1 illustrates an example in which a damaged pinion shaft is remanufactured using a salvage member 124, e.g., formed by machining a damaged pinion shaft 100, and a replacement member 134. In the example, the replacement member 134 is a single piece, e.g., including the replacement gear teeth 144 and the receptacle 146 and/or other features for attaching and/or aligning the replacement member 134 and the salvage member 124. FIG. 2 illustrates an alternative example in which a pinion shaft is formed from three pieces. For example, according to aspects described in connection with FIG. 2, below, the replacement member 134 can be a two-piece replacement member, including a first replacement member connected to a second replacement member.

In more detail, FIG. 2 is an exploded view of a remanufactured pinion shaft 200 including a salvage member 202, a first replacement member 204, and a second replacement member 206. In some examples, the salvage member 202 may be substantially identical to the salvage member 124 discussed above, and the first replacement member 204 and the second replacement member 206 may perform substantially the same functions as the replacement member 134 discussed above. Without limitation, a combination of the first replacement member 204 and the second replacement member 206 may form a single replacement member substantially identical to the replacement member 134 and/or any modifications thereto.

The salvage member 202 includes a generally cylindrical, elongate body 208 extending generally along an axis 104 between a first end 212 and a second end 214. First gear teeth 216 are formed proximate the first end 212 of the salvage member 202. A drive coupling 218 extends axially away from the first gear teeth 216 and includes a generally cylindrical outer wall 220. A slot or channel 222 is formed in the outer surface 220. Proximate the second end 214, the salvage member 202 includes an axial protrusion 224 having a plurality of splines 226 formed thereon. As will be appreciated, the salvage member 202 may be substantially identical to the salvage member 124 discussed above. Without limitation, the salvage member 202 may be formed according to processes discussed above and otherwise herein, and the salvage member 202 may be modified according to any of the example modifications discussed above in connection with the salvage member 124, and/or otherwise herein.

The first replacement member 204 includes a generally cylindrical, elongate body 228 extending generally along an axis 230 between a first end 232 and a second end 234. At the first end 232, the first replacement member 204 includes replacement gear teeth 236. Proximate the second end 234, the first replacement member 204 includes an axial protrusion 238 having a plurality of splines 240 formed thereon. The axial protrusion 238 and/or the splines 240 formed on the first replacement member 204 may be substantially identical to the axial protrusion 224 and/or the splines 226 formed on the salvage member 202. As will be appreciated, the replacement gear teeth 236 on the second replacement member 204 may be substantially identical, e.g. may perform the same functions as, original teeth removed in the process of forming the salvage member 202.

As will be appreciated, because the splines 226 on the salvage member 202 are external splines and the splines 240 on the first replacement member 204 are external splines, the salvage member 202 and the first replacement member 204 are not compatible. Instead, in the example of FIG. 2, the second replacement member 206 may be used to connect the salvage member 202 to the first replacement member 204. In more detail, the second replacement member 206 includes a generally cylindrical, elongate body 242 extending generally along an axis 244 from a first end 246 to a second end 248. An opening 250 extends axially through the elongate body 242 from the first end 246 to the second end 248, e.g., from a first face 252 at the first end 246 to an opposite second face 254 (obscured in FIG. 1) at the second end 248. Grooves 256 are formed in the opening 250 and extend generally axially from the first face 252 to the second face 254.

The second replacement member 206 facilitates attachment of the first replacement member 204 to the salvage member 202. For instance, the grooves 256 may be configured to cooperate with the splines 226 formed on the axial protrusion 224 of the salvage member 202 and with the splines 240 on the axial protrusion 238 of the first replacement member 204. Accordingly, the axial protrusion 224 may be received in the opening 250 via insertion of the axial protrusion 224 at the second end 248 of the second replacement member 206. Similarly, the axial protrusion 238 of the first replacement member 204 may be received in the opening 250 via insertion of the axial protrusion 238 at the first end 246 of the second replacement member 206. With the axial protrusion 224 and the axial protrusion 238 inserted into the second replacement member 206 in this manner, the axes 210, 244, 230 are coaxial and junctions are formed at the abutment of the salvage member 202 to the second face 254 as well as at the abutment of the first replacement member 204 to the first face 252 of the second replacement member 206. The respective members may be welded at these junctions, e.g., to secure the remanufactured pinion shaft 200 as a single pinion shaft.

In some examples, the three-piece remanufactured pinion shaft 200 may offer advantages over the two-piece configuration shown in FIG. 1. By way of nonlimiting example, when the opening 250 is formed as a through hole extending the axial length of the elongate body 242 of the second replacement member 206, manufacturing the grooves 256 may be easier than manufacturing grooves in a blind hole, as in the replacement member 134 of FIG. 1. However, the second replacement member 206 is not limited to implementations in which the opening 250 extends axially through the elongate body 242. By way of nonlimiting example, the second replacement member may include a first, blind opening extending a first axial distance from the first face 252 and a second, blind opening extending a second axial distance from the second face 254, with the first opening being configured to receive the axial protrusion 238 of the first replacement member 204 and the second opening being configured to receive the axial protrusion 224 of the salvage member 202. In some examples, forming two openings in this manner may provide for different alignment members. By way of nonlimiting example, the splines 226 on the salvage member may be formed in a first spline pattern and/or with first spline characteristics and the splines 240 on the first replacement member 204 may be formed in a second spline pattern or with different characteristics. In this example, the grooves 252 proximate the first end 246 may be different from grooves formed proximate the second end 248.

Other modifications also contemplated. For instance, although FIG. 2 refers to the salvage member 202 as including the drive coupling 218, the portions indicated as the salvage member 202 could alternatively be the first replacement member, and the portions indicated as the first replacement member 204 could be the salvage member. Moreover, although a splined arrangement is illustrated for transferring power between the components and/or for aligning the components relative to each other, other align members to promote power transmission and/or alignment may be used, including those discussed above in connection with FIG. 1 and described otherwise herein. Moreover, although the elongate body 208, the elongate body 228 and the elongate body 242 are illustrated as having substantially similar outer diameters, such is not required. However, a substantially common outer diameter may ensure that the remanufactured pinion shaft 200 can be used as a replacement for a damaged pinion shaft.

FIG. 2 illustrates the salvage member 202 as including the axial protrusion 224, the first replacement member as including the axial protrusion 238, and the second replacement member 206 as including the opening 250 for receiving the axial protrusions 224, 238. In another contemplated modification, both the salvage member 202 and the first replacement member 204 could include receptacles, like the receptacle 146 discussed above, and the second replacement member can include protrusions like the axial protrusions 224, 238. In this modification, the axial protrusions of the second replacement member 206 are received in the receptacles in the salvage member and the first replacement member. In at least one modified implementation of this alternative arrangement, the second replacement member 206 may be embodied as a post, pin, or similar cylindrical member having splines extending axially along an outer surface thereof. In this example, the splines mate with grooves formed in the receptacles in the salvage member 202 and the first replacement member 204 such that the second replacement member 206 may be received entirely in these receptacles. Stated differently, the second end 214 of the salvage member 202 may contact the second end 234 of the first replacement member when the remanufactured pinion shaft is reassembled.

Figure 3:
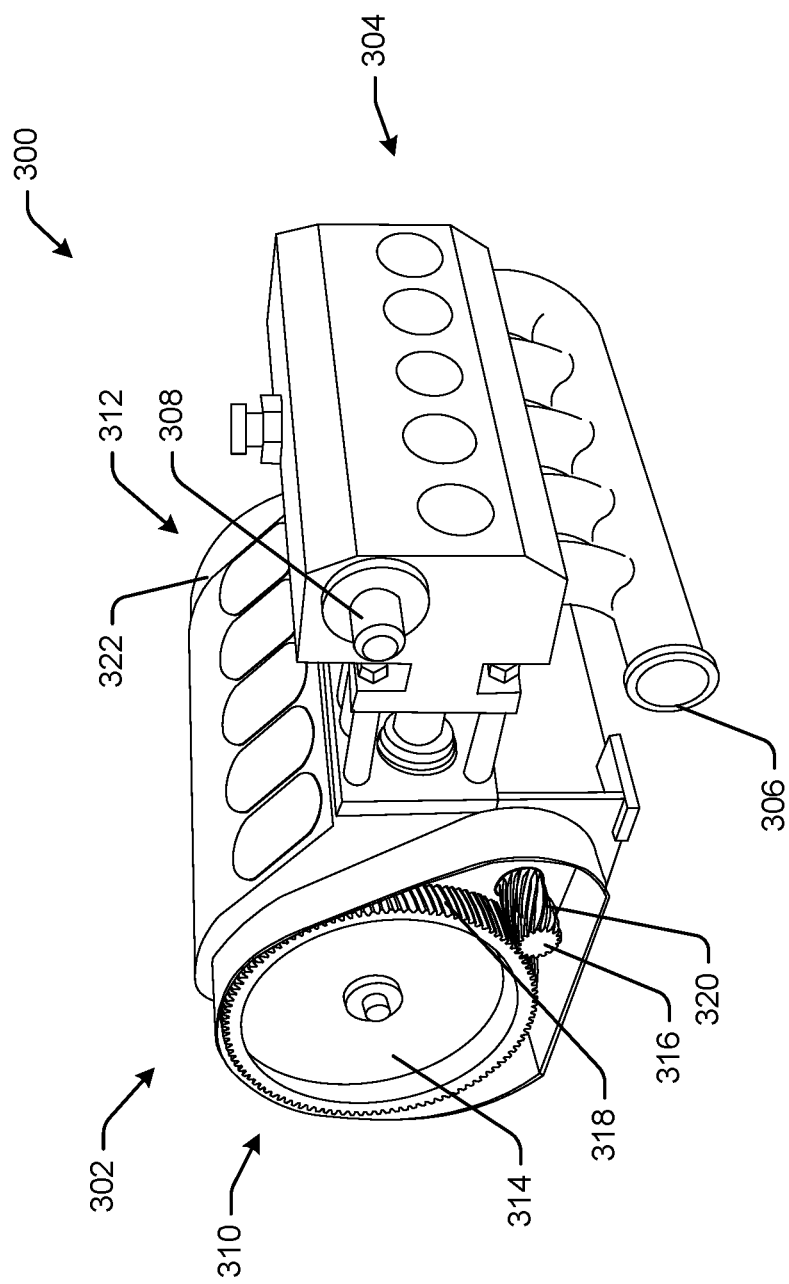
FIG. 3 is a perspective view of a pump using a pinion shaft, such as the remanufactured pinion shaft of FIG. 1 or of FIG. 2, in accordance with yet another example of the present disclosure.

FIG. 3 illustrates an example machine using a pinion shaft, such as a pinion shaft remanufactured according to the techniques described herein. In more detail, FIG. 3 illustrates an exemplary pump 300, which may be a well stimulation pump. The pump 300 includes a power body 302 and a pump body 304 coupled to the power body 302. In general, the power body 302 includes a plurality of pistons driven by an external source, e.g. a motor, to generate a pumping action at the pump body 304. The pump body 304 generally includes an inlet 306 and an outlet 308 through which fluid enter and exit the pump body 304, respectively.

The power body 302 generally includes a first end 310 and a second end 312 spaced therefrom. At the first end 310, an end cover is removed to expose a bull gear 314 and a portion of a pinion shaft 316 in cooperation with the bull gear 314. As illustrated, the bull gear 314 includes a plurality of bull gear teeth 318 and the pinion shaft 316 includes a plurality of pinion gear teeth 320 that mesh with the bull gear teeth 318. In operation, a motor or other power source (not shown), causes the pinion shaft 316 to rotate, which, via cooperation of the bull gear teeth 318 and the pinion gear teeth 320, causes the bull gear 314 to rotate. Rotation of the bull gear 314 causes pistons in the power body 302 to pump fluid through the pump body 304.

In examples, the pinion shaft 316 may be a pinion shaft such as those discussed in connection with FIGS. 1 and 2. By way of nonlimiting example, the pinion gear teeth 320 may correspond to the second gear teeth 112 (e.g., the damaged gear teeth) of FIG. 1, the replacement gear teeth 144 of FIG. 1, and/or the replacement gear teeth 236 shown in FIG. 2. Although not illustrated in FIG. 3, an opposite end of the pinion shaft 316 can include a drive coupling, such as the drive couplings 114, 218 discussed above, as well as a plurality of additional gear teeth configured to drive a second bull gear disposed at the second end 312. For instance, the second bull gear and the opposite end of the pinion shaft 316 may be in a cavity defined at least in part by an end cover 322. Pistons that effectuate the pumping at the pump body 304 may be driven by both the illustrated bull gear 314 and the unshown second bull gear at the second end 312 of the power body 302.

The pump 300 is an example machine using a pinion shaft that can be remanufactured using the techniques described herein. Shaft components in other types of pumps and/or other types of machines may also be remanufactured according to implementations of this disclosure. For instance, although the pinion shafts described herein have gear teeth at opposite ends, the gear teeth are only one example of a driving feature that may be present on a shaft remanufactured using the techniques described herein. As detailed herein, this disclosure can be used to limit waste, e.g., by reusing a functional portion of a damaged shaft, by creating a salvage member from the damaged shaft and providing a replacement member that functions equivalently to the damaged (and removed) portion of the shaft.

As noted above in connection with FIGS. 1 and 2, aspects of this disclosure include forming a salvage member from a broken, damaged, or otherwise malfunctioning pinion shaft. Creation of the pinion shaft involves creating one or more alignment members on the salvage member to cooperate with a replacement member. In examples of FIGS. 1 and 2, such power alignment members are provided by a spline arrangement. FIGS. 4, 5, and 6 show alternative arrangements for implementing power transmission and/or alignment between a salvage member and one or more replacement members.

In more detail, FIG. 4 illustrates an example salvage member 400. The salvage member 400 includes a generally cylindrical, elongate body 402 extending generally axially between a first end 404 and a second end 406. The salvage member 400 also includes gear teeth 408 and a drive coupling 410, generally as described herein. The salvage member 400 also includes an alignment member 412 disposed at the second end 406. In examples, the alignment member 412 includes one or more features for cooperating with a second alignment member, e.g., on a replacement member, to transmit power between the salvage member 400 and the replacement member and/or to align the salvage member 400 relative to the replacement member.

FIG. 4 also includes a magnified portion 414 showing an axially-aligned view of the salvage member 400 that better illustrates the alignment member 412. As shown in the magnified portion 414, the alignment member 412 includes a generally cylindrical axial protrusion 416. A plurality of splines 418 are formed radially about a circumference of the axial protrusion 416. The splines 418 are generally uniform in size and spacing. The alignment member 412 also includes an enlarged spline 420. The enlarged spline 420 has an outer surface 422 that is larger than, e.g., extends circumferentially farther than, outer surfaces of the splines 418. As will be appreciated, a receptacle, e.g., in a replacement member, may be configured as a cooperating alignment member, including a plurality of equally-spaced grooves for receiving the splines 418 and a relatively larger groove to receive the enlarged spline 420. In this example, the receptacle may receive the alignment member 412 in only a single orientation, e.g., with the enlarged spline 420 received in the enlarged groove. Accordingly, the alignment member 412, together with a cooperating alignment member in a replacement member, can ensure proper alignment of the salvage member 400 relative to the replacement member. As described further above, such alignment may be desirable to ensure that the gear teeth 408 are properly aligned relative to gear teeth formed on the replacement member. Without limitation, and as described in connection with FIG. 3, alignment of the teeth on opposite ends of a remanufactured shaft may be critical to proper functioning of drive gears in machines, such as the pump 300.

As will be appreciated, modifications to the salvage member 400 also are contemplated. For example, the number and size of the splines 418 are for example only. More fewer splines, including larger and/or smaller splines and/or splines having different features, profiles, or the like may be used, without limitation. Moreover, although only a single enlarged spline is illustrated, the alignment member 412 may include more enlarged splines 420. As will be appreciated, additional enlarged splines 420 may promote different alignments of the salvage member 400 relative to the replacement member, which may be permissible in some applications. Moreover, although only the splines Fort hundred 18 and the enlarged spline 420 are illustrated in FIG. 4, more than two spline types may be used.

FIG. 5 illustrates yet another example salvage member 500. The salvage member 500 includes a generally cylindrical, elongate body 502 extending generally axially between a first end 504 and a second end 506. The salvage member 500 also includes gear teeth 508 and a drive coupling 510, generally as described herein. The salvage member 500 also includes an alignment member 512 disposed at the second end 506. As with the alignment member 412, the alignment member 512 includes one or more features for cooperating with a second alignment member, e.g., on a replacement member, to transmit power between the salvage member 500 and the replacement member and/or to align the salvage member 500 relative to the replacement member.

FIG. 5 also includes a magnified portion 514 showing an axially-aligned view of the salvage member 500, which better illustrates the alignment member 512. As shown in the magnified portion 514, the alignment member 512 includes an axial protrusion 516 having a non-circular cross-section. More specifically, an outer surface of the axial protrusion 516 includes an arcuate portion 518 and a flat portion 520. In the example, the arcuate portion 518 has a substantially constant radius. As will be appreciated, a receptacle, e.g., in a replacement member, may be configured as a cooperating alignment feature. For instance, the receptacle may be characterized by a non-cylindrical inner sidewall, e.g., include an arcuate portion and a flat portion. In this example, the receptacle may receive the alignment member 512 in only a single orientation, e.g., with the flat portion 520 aligned with the flat portion of the receptacle. Accordingly, the alignment member 512, together with a cooperating alignment member on a replacement member, can ensure proper alignment of the salvage member 500 relative to the replacement member. As described further herein, such alignment may be desirable to ensure that the gear teeth 508 are properly aligned relative to gear teeth formed on the replacement member. Without limitation, and as described in connection with FIG. 3, alignment of the teeth on opposite ends of a remanufactured shaft may be critical to proper functioning of drive gears in a machine, such as in the pump 300.

As will be appreciated, modifications to the salvage member 500 also are contemplated. For example, the axial protrusion 516 may have other non-circular shapes. Without limitation, any number of non-circular shapes including one or more arcuate portions (e.g., an oval), one or more flat portions (e.g., a quadrilateral), or any combination thereof (e.g., the shape shown in FIG. 5 or some modification thereof) may be used with the alignment member 512. As will be appreciated, the non-circular shape selected may promote more than a single alignment of the salvage member 500 relative to the replacement member, which may be permissible in some applications. By way of example, forming the axial protrusion 516 with a square shape may promote four different alignments of the salvage member 500 relative to a replacement member including a square-shaped receptacle.

FIG. 6 illustrates another example salvage member 600. The salvage member 600 includes a generally cylindrical, elongate body 602 extending generally axially between a first end 604 and a second end 606. The salvage member 600 also includes gear teeth 608 and a drive coupling 610, generally as described herein. The salvage member 600 also includes an alignment member 612 disposed at the second end 606. As with the alignment member 412, the alignment member 612 includes one or more features for cooperating with a second alignment member, e.g., on a replacement member, to transmit power between the salvage member 600 and the replacement member and/or to align the salvage member 600 relative to the replacement member.

FIG. 6 also includes a magnified portion 614 showing an axially-aligned view of the salvage member 600, which better illustrates the alignment member 612. As shown in the magnified portion 614, the alignment member 612 includes an axial protrusion 616 having a generally cylindrical outer surface 618 and a groove or slot 620 formed in the outer surface 618. The slot 620 extends generally axially along the outer surface 618. In examples, the slot 620 is a keyway configured to receive a portion of a key 622. As will be appreciated, a receptacle, e.g., in a replacement member, may be configured as a cooperating alignment feature. For instance, the receptacle may be characterized by a substantially cylindrical inner sidewall having a cooperating, axially extending protuberance received in the slot 620. In some examples, the slot 620 may be a keyway and the receptacle may have a slot or keyway similar to the slot 620. In this example a key 622 may be partially received in the slot 620 and partially received in the keyway formed in the receptacle. In these examples, the receptacle may receive the alignment member 612 in only a single orientation. Accordingly, the alignment member 612, together with a cooperating alignment member in a replacement member, can ensure proper alignment of the salvage member 600 relative to the replacement member. As described further herein, such alignment may be desirable to ensure that the gear teeth 608 are properly aligned relative to gear teeth formed on the replacement member. Without limitation, and as described in connection with FIG. 3, alignment of the teeth on opposite ends of a remanufactured shaft may be critical to proper functioning of drive gears in a machine, such as in the pump 300.

Modifications to the salvage member 600 also are contemplated. For example, the slot 620 may be formed in a different location about the circumference of the axial protrusion 616. Moreover, the width, depth, and/or other aspects of the slot 620 may be modified. Also in examples, more than one slot 620 may be formed. More slots may promote more than a single alignment of the salvage member 600 relative to the replacement member, which may be permissible in some applications. For instance, more slots may provide for greater power transmission than a single slot, e.g., because multiple keys may be used to transfer power between the salvage member 600 and the replacement member.

FIGS. 4, 5, and 6 are intended to show alternate examples for power transmission and/or alignment of a salvage member to a replacement member, generally as described herein. Each include an alignment member 412, 512, 612 configured for cooperating with an alignment member on a receptacle. In other implementations, however, the salvage members 400, 500, 600 may alternatively include a receptacle configured to receive respective ones of the alignment members 412, 512, 612. In these examples, the alignment members 412, 512, 612 may be formed on the replacement member (not illustrated in FIGS. 4, 5, 6). Moreover, the alignment members 412, 512, 612 are for illustration only, as other alignment features may be used. Any feature, or combination of features, that promotes power transfer between the salvage member and the replacement member and/or that aligns the salvage member relative to the replacement member may be used as the alignment members. Some implementations can include a combination of alignment members. By way of non-limiting example, one or more splines, such as the splines 418, may be disposed on the arcuate portion 518 and/or the flat portion 520 of the salvage member 500 and/or on the outer surface 618 of the alignment member 612. In addition, although the salvage members 400, 500, 600 are illustrated as including the drive couplings 410, 510, 610, the alignment members 412, 512, 612 may be formed on other salvage members (e.g., a salvage member corresponding to an opposite end of a pinion shaft).

Figure 7:
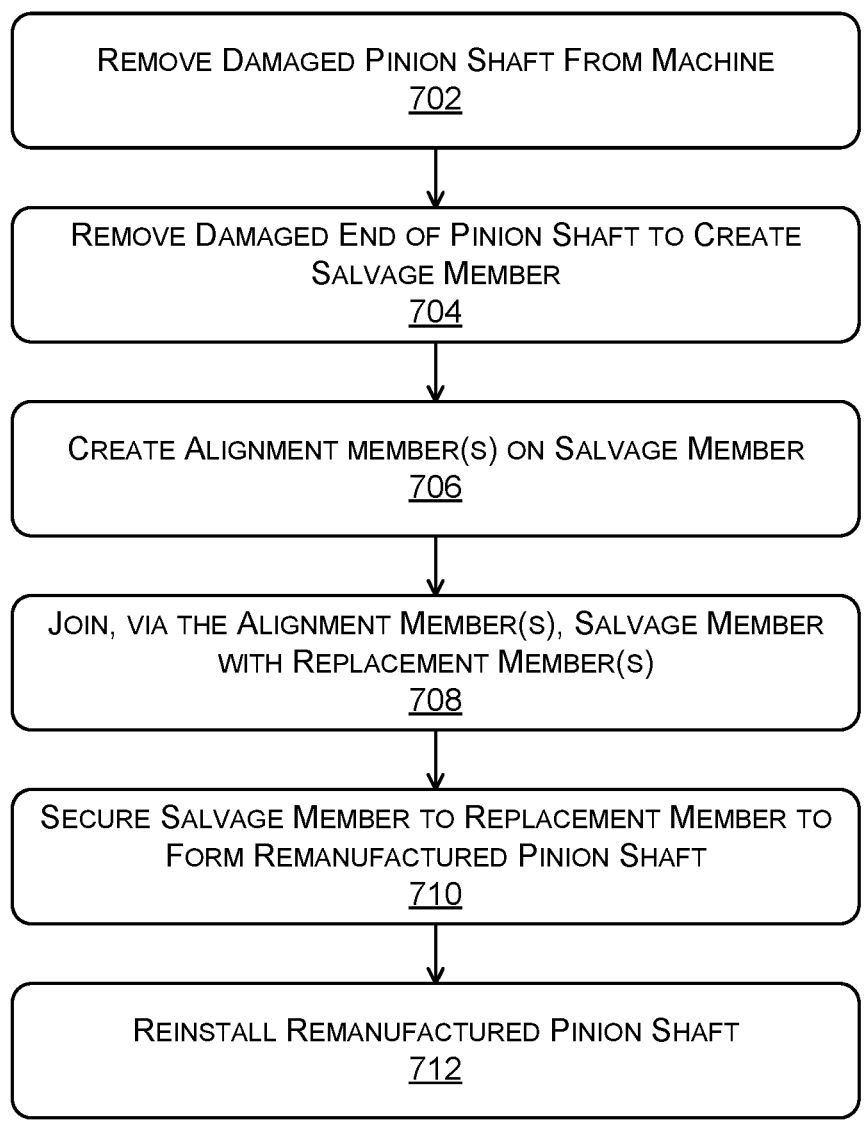
FIG. 7 is a flowchart illustrating a method of forming and using a remanufactured pinion shaft, in accordance examples of the present disclosure.

FIG. 7 illustrates an example method 700 of remanufacturing a pinion shaft. As discussed further herein, the remanufactured pinion shaft may reduce waste by obviating the need to scrap an entire pinion shaft, e.g., when only a portion of the pinion shaft is damaged. While the techniques described in association with the method 700 can be used in connection with the remanufactured pinion shaft 154 and/or the remanufactured pinion shaft 200, the method 700 may be used to remanufacture other shafts, as well.

At an operation 702, the method 700 includes removing a damaged pinion shaft from a machine. As described herein, a pinion shaft, such as the pinion shaft 316, may be used in the pump 300. In some instances, portions of the pinion shaft 316 can become worn, damaged, or otherwise unsuitable for proper use in the pump 300. For instance, the pinion gear teeth 320 on the pinion shaft can include a damaged portion like the damaged portion 120 illustrated in FIG. 1. At the operation 702, the power body 302 may be disassembled, and the pinion shaft 316 may be removed from the power body. In some examples, the pinion shaft 316 may be de-coupled from a power source (e.g., a motor) and separated from bearings and/or other mechanical components.

At an operation 704, the method 700 includes removing a damaged end of the pinion shaft to create a salvage member. For example, and with reference to FIG. 1, the damaged pinion shaft 100 may be cut or otherwise machined, e.g., at an axial position along the elongate body 102, to form two portions. The first portion, including the damaged portion 120, is discarded, and the second portion, including still-functional components, is retained as the salvage member 124. Other example salvage members can include the salvage members 202, 400, 500, 600, and/or modifications thereto, as disclosed herein.

At an operation 706, the method 700 includes creating one or more alignment members on the salvage member. For example, an end of the salvage member 124 opposite the functional gear teeth 110 may be machined to form the axial protrusion 128 and the splines 132 may be formed thereon. In other examples, the salvage member end 126 may be machined to include the receptacle 146 and the grooves 150 on the surface of the receptacle 146. Other examples alignment members are shown in and described in connection with FIGS. 4, 5, and 6, above. As will be appreciated, the salvage member 124 may be machined, e.g., using conventional machining processes, to include one or more features that cooperate with features on a mating replacement member, e.g., to transfer rotational motion with the replacement member and/or to align the salvage member relative to the replacement member.

At an operation 708, the method 700 includes joining, via the alignment member(s), the salvage member with one or more replacement members. For example, the alignment member may include the splines 132, which may be received in the grooves 150 in the receptacle 146. Alternatively, as shown in FIG. 2, the replacement member can have multiple parts, e.g., the first replacement member 204 and the second replacement member 206, and the alignment feature can include the splines 226 or the splines 240, configured to cooperate with the grooves 256 formed in the opening 250. As will be appreciated, the salvage member and the replacement member(s) include the alignment member(s) to facilitate proper joining of the disparate members as a single shaft.

At an operation 710, the method 700 includes securing the salvage member to the replacement member to form a remanufactured pinion shaft. For example, the salvage member 124 and the replacement member 134 can be secured at the junction 156, e.g., using one or more conventional techniques. In some examples, welding may be used to secure the junction 156. For example, abutting surfaces of the salvage member 124 and the replacement member 134, e.g., the salvage member face 130 and the replacement member face 148, can be joined using a butt joint. In other examples, the salvage member 124 and/or the replacement member 134 may be further machined or prepared to facilitate attachment. By way of non-limiting example, chamfers or other features may be formed about a circumference of the salvage member face 130 and/or the replacement member face 148. Such chamfer(s) or other features may provide a groove to facilitate groove welding, for example. Other techniques can also be used to facilitate attachment. For instance, the alignment members may include threads and the threads may be used to secure the salvage member and the replacement member. Other connection techniques, which may include sleeves, collars, pins, friction between the first and second alignment members, and/or the like may also be used, as will be appreciated by those having ordinary skill in the art, with the benefit of this disclosure.

At an operation 712, the method 700 includes reinstalling the remanufactured pinion shaft. For example, the remanufactured pinion shaft 154 or the remanufactured pinion shaft 200 may be reinstalled in the pump 300, e.g., as the pinion shaft 316.

The method 700 allows for repair of a machine, such as the pump 300, without need for a new pinion shaft. The techniques provide for reduced waste because at least a portion of the original pinion shaft is salvaged and/or for reduced tool cost associated with a new part.

INDUSTRIAL APPLICABILITY

The present disclosure provides remanufactured pinion shafts and methods of making remanufactured pinion shafts. The pinion shaft can be used on a number of machines, including pumps. The remanufactured pinion shaft may be particularly well suited for use with a well stimulation pump. The processes described herein are not limited to being used to remanufacture pinion shafts. The processes can be used to remanufacture many different shafts used for many different applications.

According to some implementations, a damaged pinion shaft 100 can include a damaged portion 120 that prevents the damaged pinion shaft 100 from performing correctly. The damaged pinion shaft 100 can be severed along its axial length to form a salvage member 124 including still-functional portions of the damaged pinion shaft 100. The salvage member 124 can be further machined to include one or more alignment members. For instance, the alignment members can include the splines 132. The alignment member(s) of the salvage member 124 is/are configured to cooperate with one or more compatible alignment members on a replacement member, such as the replacement member 134. For instance, the replacement member 134 includes the grooves 150 configured to cooperate with the splines 132 on the salvage member. The alignment members facilitate alignment of the salvage member 124 and the replacement member 134 and/or provide a mechanism by which rotation is transferred between the salvage member 124 and the replacement member 134.

While aspects of the present disclosure have been particularly shown and described with reference to the examples above, it will be understood by those skilled in the art that various additional implementations may be contemplated by the modification of the disclosed machines, systems and methods without departing from the spirit and scope of what is disclosed. Such implementations should be understood to fall within the scope of the present disclosure as determined based upon the claims and any equivalents thereof

What is claimed is:

1. A method of remanufacturing a pinion shaft comprising:
   providing a pinion shaft comprising a first generally cylindrical body extending axially from a first end to a damaged end, the pinion shaft further comprising a plurality of first gear teeth proximate the first end,
   cutting the pinion shaft at a position between the first end and the damaged end to form a salvage member comprising the first end, the plurality of first gear teeth, and a second end spaced axially from the first end;
   forming, on the salvage member proximate the second end, an axial protrusion;
   providing a replacement member comprising a second generally cylindrical body extending axially from a third end to a fourth end, a second plurality of gear teeth proximate the third end, and a receptacle proximate the fourth end; and
   securing the salvage member to the replacement member such that the axial protrusion is received in the receptacle.

2. The method of claim 1, further comprising:
   forming a plurality of splines on the axial protrusion,
   wherein the replacement member further comprises a plurality of grooves formed in the receptacle, the grooves being sized and positioned to receive the plurality of splines with the salvage member secured to the replacement member.

3. The method of claim 1, wherein a first outer diameter of the first generally cylindrical body is substantially the same as a second outer diameter of the second generally cylindrical body.

4. The method of claim 1, further comprising:
   forming a first alignment member on the axial protrusion,
   wherein the replacement member comprises a second alignment member, and
   wherein the first alignment member and the second alignment member cooperate to position the first plurality of gear teeth relative to the second plurality of gear teeth with the salvage member secured to the replacement member.

5. The method of claim 4, wherein the first alignment member and the second alignment member comprise at least one of:
   a key and a channel configured to receive the key;
   a spline and groove arrangement; or
   a non-circular cross-section of the axial protrusion and the receptacle.

6. The method of claim 1, wherein the replacement member comprises:
   a first replacement portion comprising the second plurality of gear teeth; and
   a second replacement portion separate from and configured to mate with the first replacement portion, the second replacement portion comprising the receptacle, the method further comprising:
   securing the first replacement portion to the second replacement portion to form the replacement member.

7. The method of claim 6, wherein:
   the second replacement portion comprises a third substantially cylindrical body extending axially from the fourth end to a fifth end opposite the fourth end, the receptacle comprises an opening extending axially through the third substantially cylindrical body from the fourth end to the fifth end, the first replacement portion comprises a fourth substantially cylindrical body including the third end and a sixth end opposite the third end, the first replacement portion having a second axial protrusion, at the sixth end, sized to be received in the opening proximate the fifth end, and the securing the first replacement portion to the second replacement portion comprises coupling the first replacement portion to the second replacement portion such that the second axial protrusion of the first replacement member is disposed in the opening proximate the fifth end of the second replacement portion.

8. The method of claim 7, wherein:

the first replacement portion comprises a first alignment member on the second axial protrusion and the second replacement portion comprises a second alignment member in the receptacle, and the securing the first replacement portion to the second replacement portion comprises aligning the first alignment member relative to the second alignment member to position the second gear teeth relative to a third alignment feature disposed in the opening proximate the fourth end of the cylindrical body.

9. A method of making a remanufactured pinion shaft comprising:

providing a pinion shaft comprising a first generally cylindrical body extending axially from a first end to a damaged end, the pinion shaft further comprising a plurality of first gear teeth proximate the first end, cutting the pinion shaft at a position between the first end and the damaged end to form a salvage member comprising the first end, the plurality of first gear teeth, and a second end spaced axially from the first end;

forming, on the salvage member proximate the second end, a first alignment member;

providing a replacement member comprising a second generally cylindrical body extending axially from a third end to a fourth end, a second plurality of gear teeth proximate the third end, and a second alignment member proximate the fourth end; and securing the salvage member to the replacement member such that the first alignment member cooperates with the second alignment member to align the plurality of first gear teeth relative to the plurality of second gear teeth.

10. The method of claim 9, wherein the first alignment member and the second alignment member comprise at least one of:

one or more splines and one or more grooves configured to receive the one or more splines;

a key and a channel configured to receive the key; or a protrusion comprising other than a circular cross-section and a receptacle configured to receive the protrusion.

11. The method of claim 9, wherein the securing the salvage member to the replacement member comprises welding the salvage member to the replacement member.

12. The method of claim 9, wherein the providing the replacement member comprises:

providing a first replacement portion comprising the second plurality of gear teeth; and providing a second replacement portion separate from and configured to mate with the first replacement portion, the second replacement portion comprising the second alignment member, the method further comprising:

securing the first replacement portion to the second replacement portion to form the replacement member.

13. The method of claim 12, wherein:

the second replacement portion comprises a third substantially cylindrical body extending axially from the fourth end to a fifth end opposite the fourth end;

an opening extends axially through the third substantially cylindrical body from the fourth end to the fifth end;

the opening defines an interior surface; and the second alignment member comprises a plurality of grooves formed in the interior surface.

14. The method of claim 13 wherein:

the first alignment member comprises a first plurality of splines configured to be received in the plurality of grooves; and the first replacement portion comprises a second plurality of splines configured to be received in the plurality of grooves.

* * * * *